A. WORK.
Hose-Coupling.

No. 166,177.  Patented July 27, 1875.

Witnesses  
Philip R. Larner  
A. B. Cauldwell

Inventor  
Alanson Work  
By Wm. Work  
Attorney

UNITED STATES PATENT OFFICE.

ALANSON WORK, OF PROVIDENCE, RHODE ISLAND.

IMPROVEMENT IN HOSE-COUPLINGS.

Specification forming part of Letters Patent No. 166,177, dated July 27, 1875; application filed November 21, 1874.

*To all whom it may concern:*

Be it known that I, ALANSON WORK, of the city and county of Providence, in the State of Rhode Island, have invented certain new and useful Improvements in Hose-Couplings; and I do hereby declare that the following specification, taken in connection with the drawings furnished and forming a part of the same, is a clear, true, and accurate description thereof.

My improvements relate to novel means for connecting hose to the couplings. Various methods of attaching hose to couplings have been heretofore employed, involving the employment of devices of varied character. Many of these methods have been devised with special view to avoiding abrasion of the inner surface of the hose. So far as my experience extends, there were, however, none prior to the date of my present invention which, in practice, would admit of the hose and coupling being securely connected without more or less liability of abrading the said inner surfaces of the hose. Hose made of leather is of such a character as to enable it to practically resist undue or injurious abrasion, and it is therefore for use with the so-called rubber hose, or canvas hose with a rubber lining, that my present improvements are of particular value.

My invention consists in the combination, with a tail-piece and an interior screw sleeve or band, of an expansive holding-ring, which, by being expanded, is wholly embedded into the hose, and made to engage therewith in holding contact after the manner of an engaging shoulder, and at the same time perform the functions of a friction-band for relieving the interior rubber surface of the hose from abrasion incident to the advance of the tail-piece into its proper position with relation to the exterior screw-sleeve.

Figure 1:
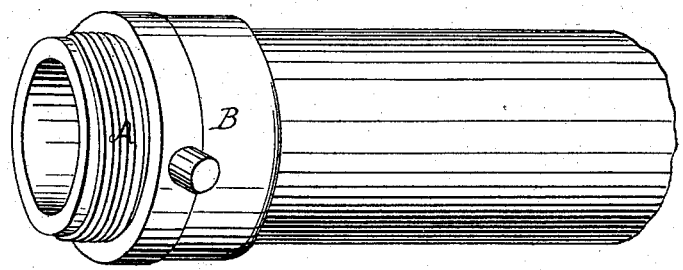
Figure 2:
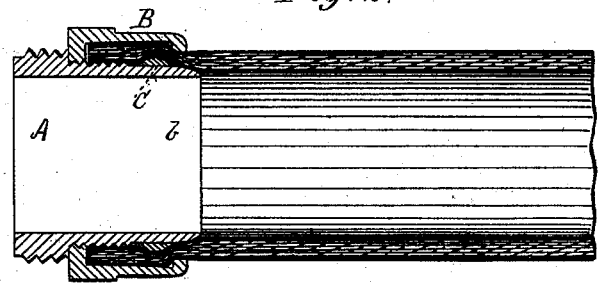
Figure 3:
Figure 4:
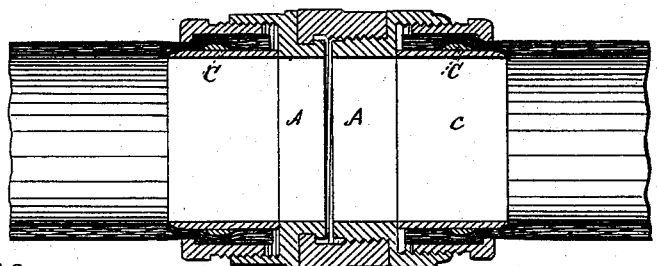

Referring to the drawings, Figure 1 represents a section of one of my couplings attached to hose. Fig. 2 represents the same in longitudinal section. Fig. 3 represents the expansible ring detached from the coupling. Fig. 4 represents, in section, such a hose-coupling as is described in my Letters Patent dated March 10, 1874, provided with the expansible ring to which my present invention relates.

In each instance A denotes the body of the coupling. The tail-piece *b* and threaded sleeve or band B shown herein are of a construction long in use and well known. In Fig. 3 the coupling shown has a detachable tail-piece, *c*, which is made in accordance with a previous invention of mine, covered by Letters Patent No. 148,540, dated March 10, 1874.

It will be seen, in connection with the form of coupling shown in Fig 2, that, in securing hose thereto, either the tail-piece or the band is revolved on the screw-thread while the two are approaching their proper relative positions. In practice the sleeve or band is slipped upon the hose, the tail-piece inserted into the end of the hose, and the band brought into connection with the screw-thread on the body of the coupling. During the turning of the body of the coupling the tail-piece is rotated, and at the same time advanced longitudinally into the hose while in close contact therewith under great pressure. This movement of the tail-piece is liable to, and does in practice, seriously abrade and cut the inner rubber lining of the hose, which cutting and abrasion allows the water to penetrate into the canvas on which the hose relies solely for its strength, and results in the speedy rotting of the canvas at that point. In my improved patented coupling before referred to the tail-piece is independent of the body, and therefore has no rotative movement while the body and band are being screwed together. The tail-piece is, however, advanced longitudinally, while the hose is greatly compressed between it and the band, and this longitudinal movement of the tail-piece, slight as it may appear, is liable to so cut and abrade the inner rubber lining as to permit the entrance of water to the canvas, as before stated. This is practically obviated by the employment of the expansible ring, shown in section at C in Fig. 2, and also in perspective in Fig. 3, as if detached from the coupling. This ring may be composed of any soft metal which is capable of permitting the ring to be evenly expanded diametrically. I prefer that its outer surface be curved or rounded, as shown in the drawings. I find that lead is a good metal for the purpose, and is as economical as any known to me suitable for use in this connection. A harder metal may be profitably employed—as, for instance, an alloy of lead and tin. Copper may also be used, if it be pure and soft; but I prefer lead, as it possesses the desired ductile properties, and is easily worked in this connection.

The ring C is applied by me in practice as follows: The hose is first inclosed by the band B. The ring, originally of a diameter which will admit it to freely enter the hose, is then placed therein at a point, say, midway between the ends of the bearing-surface of the band. While in that position it is mechanically expanded by the application of uniform radial pressure within the ring. For this purpose a tapering mandrel may be employed; or this may be done with a device like that long in use for expanding the ends of copper boiler-tubes, and which is too well known to require herein specific description. I have used with success an expanding device composed of segments of a steel ring, with a steel shank to each. When operatively arranged, these shanks occupy radial positions in slots radially cut in a collar of a hollow spindle. A tapering arbor being inserted within the hollow spindle, and driven downward with uniformity of action, forces each segment outward, and by that means the ring is expanded to a size which will readily admit the tail-piece to enter and fill the ring, and to expand it still further as the tail-piece is advanced by its screw-thread. During the advancement of the tail-piece it will be seen that the friction is borne mainly by the ring and the tail-piece at their points of contact, and for that reason the interior rubber-surface is not liable to injury, and practically remains intact and perfect. The exterior surface of the tail-piece is inclined toward its end, so as to enable it to readily enter the ring, to continue its expansion, and to be gradually advanced against the rubber surface without injury thereto. In employing the detachable neck c, as shown in Fig. 3, there is, of course, no rotation of the neck, as a bearing-surface is afforded between its rear end, and an annular shoulder on the body of the coupling, whereby the neck is bodily advanced, and the ring completely expanded.

When hose is secured to a coupling by means of the tail-piece, band, and expansible ring, as shown, the ring having been forced laterally or radially into position without a particle of rotative or longitudinal movement, there is, therefore, no possibility of injury to the lining adjacent thereto during the operation. The ring, too, serves as a means for so expanding the hose that the end of the tail-piece, while being rotated and advanced, is not in such contact with the adjacent rubber surface as will render the abrasion thereof practically possible. As heretofore employed, friction-bands have performed a protective function only, and, by reason of their construction and arrangement, have not served as holding devices. A prominent instance of such a band is, as I believe, first shown in the patent issued to Albert F. Allen, dated January 30, 1872, No. 123,070. Therein, the band is described as an open or cut-flanged band, composed of sheet metal, which, when inserted into the end of the hose, constitutes to the extent of its length a metallic lining, against which the abrasive action of the tail-piece must necessarily be expended. My expansive ring differs in its operative functions from such friction-bands in one important particular, in that it not only serves as a frictional band, but also operates as an engaging shoulder for retaining unity of the hose with the coupling. This will be obvious when it is observed that, with my expansive ring, the hose will be firmly united thereby to the exterior sleeve, even after the tail-piece has been wholly withdrawn. In other words, a friction-band performs no holding function unaided by the tail-piece, while my expansive band, when placed in position, in point of fact, exercises a holding function independently of the tail-piece. I have shown in the drawings an annular inward projection or shoulder at the end of the band B, but this constitutes no part of my present invention. It has a valuable effect in this connection, but results of equally practicable value may be attained if the interior of the band be gradually lessened in diameter from the screw-thread to its outer end.

I do not, therefore, limit myself to a band of any particular construction, so long as it affords a surface between which and the expansible ring the hose may be annularly compressed. Nor do I limit myself to a tail-piece of any particular character or special construction, so long as it affords an exterior annular surface with which the interior of the expansible ring may be in contact, and by which said ring may be either slightly expanded or retained securely in position after it has been by other means fully expanded.

The decrease of frictional contact between the tail-piece and the expansible ring and the adjacent surface of rubber, as compared with the frictional contact of the tail-piece and rubber, as formerly applied, may be illustrated by the fact that one man with an ordinary hand-wrench may successfully attach my improved couplings to hose, while without the expansible ring, and with a tail-piece and band, as heretofore employed, two men with a long lever-wrench have been requisite to perform the attaching operation.

Having thus described my invention, I claim as new—

In a hose-coupling, the combination with an interior tail-piece and an exterior band or sleeve, of the expansible ring C, which, when in position, engages with the hose as a holding device by being embedded therein, and which also serves as a friction-band, substantially as described.

ALANSON WORK.

Witnesses:
JOHN C. PURKIS,
HENRY MARTIN.